US011892272B1

(12) United States Patent
Oral

(10) Patent No.: US 11,892,272 B1
(45) Date of Patent: Feb. 6, 2024

(54) BLADED DEVICES WITH ARCING, STUN, AND/OR SHOCK FUNCTIONALITY

(71) Applicant: Demir Oral, Rio Rancho, NM (US)

(72) Inventor: Demir Oral, Rio Rancho, NM (US)

( * ) Notice: Subject to any disclaimer, the term of this patent is extended or adjusted under 35 U.S.C. 154(b) by 130 days.

(21) Appl. No.: 17/479,937

(22) Filed: Sep. 20, 2021

Related U.S. Application Data

(60) Provisional application No. 63/080,540, filed on Sep. 18, 2020.

(51) Int. Cl.
*F41H 13/00* (2006.01)
*B26B 11/00* (2006.01)

(52) U.S. Cl.
CPC ........ *F41H 13/0018* (2013.01); *B26B 11/008* (2013.01)

(58) Field of Classification Search
CPC ........................... F41H 13/0018; B26B 11/008
USPC .......................................................... 361/232
See application file for complete search history.

(56) References Cited

U.S. PATENT DOCUMENTS

| | | | |
|---|---|---|---|
| 569,103 | A | 10/1896 | Jansen |
| D94,945 | S | 3/1935 | Burdge |
| 2,782,308 | A | 2/1957 | Rug |
| 2,896,131 | A | 7/1959 | Fred |
| 3,362,711 | A | 1/1968 | Larsen et al. |
| 3,487,319 | A | 12/1969 | Robison |
| 4,084,218 | A | 4/1978 | Kenney |
| 4,711,030 | A | 12/1987 | Ruston, Sr. |
| 4,969,267 | A | 11/1990 | Anenberg |
| 5,054,200 | A | 10/1991 | Davis, Jr. |
| 5,139,507 | A | 8/1992 | Dolgin et al. |
| 5,146,684 | A * | 9/1992 | Hagler .................. B26B 29/025 30/162 |
| 5,417,704 | A | 5/1995 | Wonderley |
| 5,440,814 | A | 8/1995 | Hall et al. |
| 5,467,247 | A | 11/1995 | De et al. |
| 5,568,888 | A | 10/1996 | Seber |
| 5,986,872 | A | 11/1999 | Chaput |
| D461,868 | S | 8/2002 | Hall et al. |
| 6,945,842 | B1 | 9/2005 | Gulmesoff |
| D517,156 | S | 3/2006 | Hibben et al. |
| 7,353,984 | B2 | 4/2008 | Quail |

(Continued)

FOREIGN PATENT DOCUMENTS

| | | | |
|---|---|---|---|
| CA | 2577226 C | 3/2013 | |
| CN | 210664132 U | 6/2020 | |
| WO | WO-2006017927 A1 * | 2/2006 | ............. F41B 13/00 |

*Primary Examiner* — Yemane Mehari
(74) *Attorney, Agent, or Firm* — Philip D. Askenazy; Peacock Law P.C.

(57) ABSTRACT

Bladed devices that can be used for training, warning, or defense. Conductive elements are separated from the conductive blade, which can have sharp or dull edges, by an insulating material. When triggered the device can produce that can produce arcing or sparking between the conductive elements and the blade giving the device an intimidating appearance. When an opponent is near or contacts the blade, the device can shock or stun the opponent. The spark that they can be discharged when activated by the user and/or another event, such as contact with a person. The device can have any configuration, such as a knife, folding knife, dagger, sword, axe, arrow, spear, hatchet, and machete. A sheath can be used to protect sharp edges of the blade while still producing the desired electrical effects.

20 Claims, 14 Drawing Sheets

(56) References Cited

U.S. PATENT DOCUMENTS

| | | | | |
|---|---|---|---|---|
| 7,472,484 | B2 | 1/2009 | Smilanich | |
| 7,827,638 | B1 | 11/2010 | Klick | |
| 7,833,130 | B1 | 11/2010 | Horvath | |
| RE45,801 | E | 11/2015 | Krudo | |
| 10,363,675 | B2 * | 7/2019 | Robinson | B26B 3/00 |
| 2003/0159220 | A1 * | 8/2003 | Trbovich, Jr. | B26B 11/008<br>30/140 |
| 2003/0165042 | A1 | 9/2003 | Stethem | |
| 2006/0038002 | A1 | 2/2006 | Quail | |
| 2006/0164824 | A1 | 7/2006 | Kim | |
| 2006/0168872 | A1 | 8/2006 | Locklear | |
| 2007/0019358 | A1 | 1/2007 | Kroll | |
| 2007/0245570 | A1 | 10/2007 | Tsuda | |
| 2008/0313911 | A1 | 12/2008 | Phipps | |
| 2009/0038164 | A1 | 2/2009 | Vitantonio et al. | |
| 2009/0313765 | A1 | 12/2009 | Krudo | |
| 2021/0078189 | A1 | 3/2021 | Bin Othman | |

* cited by examiner

BLADED DEVICES WITH ARCING, STUN, AND/OR SHOCK FUNCTIONALITY

CROSS-REFERENCE TO RELATED APPLICATIONS

The present application claims priority to and the benefit of the filing of U.S. Provisional Patent Application No. 63/080,540, entitled "Bladed Devices with Stun or Shock Functionality", filed on Sep. 18, 2020, the entirety of which is incorporated herein by reference.

BACKGROUND OF THE INVENTION

Field of the Invention (Technical Field)

The present invention is related to devices with arcing, stun, and/or shock functionality that can take the form of a bladed or sharp weapon such as a knife, sword, axe, spear, or arrow.

Background Art

Note that the following discussion may refer to a number of publications and references. Discussion of such publications herein is given for more complete background of the scientific principles and is not to be construed as an admission that such publications are prior art for patentability determination purposes.

For thousands of years bladed weapons have been used in combat in a primarily offensive and very lethal manner. The advent of electricity heralded new methods of manufacturing and distributing bladed weapons. However, the function of the weapon itself remained unchanged in a combat scenario.

Current knives and other bladed weapons have a singular, generally lethal, functionality when deployed in a self-defense or other hand-to-hand combat scenario. Embodiments of the present disclosure may give a significant non-lethal advantage, which may include an intimidation factor, when used in defensive scenarios.

SUMMARY OF THE INVENTION (DISCLOSURE OF THE INVENTION)

An embodiment of the present invention is a device comprising an electrically conductive blade; one or more electrically conductive elements; one or more electrically insulating elements separating the one or more electrically conductive elements from the blade; a power supply; a circuit configured to enable the blade and/or the one or more electrically conductive elements to produce an electrical effect; a switch for electrically connecting the circuit to the blade and/or the one or more electrically insulating elements; and a member electrically insulated from the blade and the one or more electrically conductive elements, the member configured for the user to grip the device. The blade optionally does not comprise any sharp edges or points. The electrical effect is preferably selected from the group consisting of sparking, arcing, shocking an opponent of the user of the device, stunning an opponent of the user of the device, or combinations thereof. The sparking or arcing preferably either occurs between the blade and the one or more electrically conductive elements across the one or more electrically insulating elements, or between two of the one or more electrically conductive elements. Shocking an opponent of the user of the device or stunning an opponent of the user of the device can occur when the opponent is near the device or is in contact with the device. At least one of the one or more electrically insulating elements can be disposed on the surface of the blade or within a channel in the surface of the blade. The device can be configured to resemble a weapon selected from the group consisting of knife, dagger, sword, axe, arrow, spear, hatchet, and machete.

The device may optionally be configured as a folding knife, wherein at least one of the electrically conductive elements comprises a prong extending from the device when the blade is in a closed position. The prong is preferably disposed within the member when the blade is in the closed position. The member preferably comprises one or more electrical contacts. When the blade is in the closed position, one of the electrical contacts electrically preferably connects the prong to the circuit. When the device comprises two prongs, the member preferably comprises two electrical contacts, and, when the blade is in the closed position, each of the two electrical contacts preferably electrically connects one of the two prongs to the circuit. In this embodiment the member preferably comprises two electrical contacts, and, when the blade is in the open position, one of the electrical contacts preferably electrically connects the blade to the circuit, and the other electrical contact preferably electrically connects the circuit to a blade electrically conductive element, wherein the blade electrically conductive element is disposed on an electrically insulating element disposed on a surface of the blade or in a channel in the surface of the blade. When the blade is between the open position and the closed position, the two electrical contacts are preferably not electrically connected to the two prongs or the blade. The folding knife preferably comprises an insulating mount to which the blade and the prong are mounted, the insulating mount comprising a plurality of mount contacts for connecting to the one or more electrical contacts.

Another embodiment of the present invention is a sheath configured for use with the device, wherein when the sheath is installed it at least partially covers the blade. The sheath preferably comprises one or more electrically conductive portions, wherein when the sheath is installed the one or more electrically conductive portions are electrically connected to the blade and/or one or more of the electrically conductive elements. When the device is operated, the one or more electrically conductive portions of the sheath preferably produce an electrical effect, wherein the electrical effect is preferably selected from the group consisting of sparking, arcing, shocking an opponent of a user of the device, stunning an opponent of a user of the device, or combinations thereof.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate the practice of embodiments of the present invention and, together with the description, serve to explain the principles of the invention. The drawings are only for the purpose of illustrating certain embodiments of the invention and are not to be construed as limiting the invention. In the drawings.

DETAILED DESCRIPTION OF EMBODIMENTS OF THE INVENTION

Figure 1:
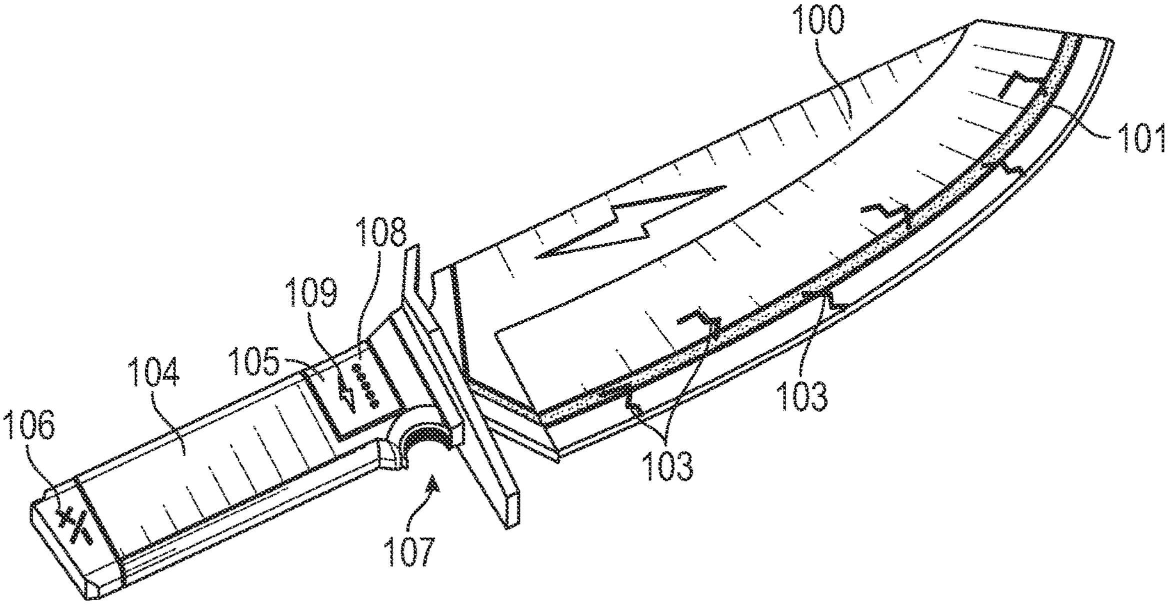
FIG. 1 shows a schematic elevational view of one embodiment of the present invention as a knife or sword.

Embodiments of the present invention are devices for fighting, intimidating, and/or subduing a potential or actual attacker that add stun or shock functionality to a bladed weapon. Different embodiments may differ in shape, size, edge-honing, and look. The devices preferably comprise an electronics package, a handle preferably comprising an insulating element, a blade preferably comprising a conductive material, and various channels comprising conductive and insulating elements built throughout the blade in a way that conveys sufficient voltage and/or direct current (DC) or alternating current (AC) meant for shocking, stunning or intimidating an attacker. The blade may be sharpened or at least partially unsharpened.

Traditional blade-crafting methods may be utilized to construct the embodiments. For example, a steel blade may be forged, milled and heat-treated to appropriate hardness and edge-honing to suit the embodiment's design.

The insulating and conductive elements or channels on the blade are preferably chemically, electrically, mechanically, or otherwise bonded to the blade and to each other, and are preferably bonded to the blade in such a way that does not significantly impede innate bladed properties such as cutting. Chemical bonds may include resins, epoxies, glues, electrochemical anodization, or other methods well-known in the art. Mechanical bonds may include screws, nuts, bolts, fasteners, or other methods well-known in the art. Otherwise, placement of the insulating and conductive elements may vary; the very edge of the blade, spine of the blade, pommel or tang, other surfaces on the blade, or holes, cut-outs, tunnels or other tooling on or within the blade may be suitable for these elements. The core of the design itself may comprise an insulating element to which the blade is mounted.

The electronics package is preferably configured to charge the blade and conductive channel(s) with AC or DC to voltages of opposing polarity or different voltage levels of the same polarity. When activated, the electronics package delivers a first electrical charge to the blade, and then a second, opposite electrical charge to the conductive element(s). The insulating element(s) separate the blade and the conductive element(s), preventing shorting. When the device is active and is not in contact with an attacker, the device preferably creates visible and audible electric sparks and arcing in the air between the conductive element(s) and the blade. When the device is active and in contact with an attacker, the attacker closes the circuit between the charged conductive element(s) and the charged blade, resulting in the attacker being shocked and/or stunned. The device may utilize a specialized sheath to reduce or eliminate lethality. Additionally, due to the availability of a battery on the device, the device may power other electronics.

In other embodiments the conductive elements may take the form of, for example, blades, studs, mesh, or prongs, or any other form. Multiple conductive elements may be electrically connected together so they have the same charge, including elements having a different form, such as studs and blades. The oppositely charged elements are preferably separated by an air gap or an insulating or other non-conductive element. In some embodiments multiple elements having the same charge are separated from each other by an air gap and/or an insulating element.

Figure 2:
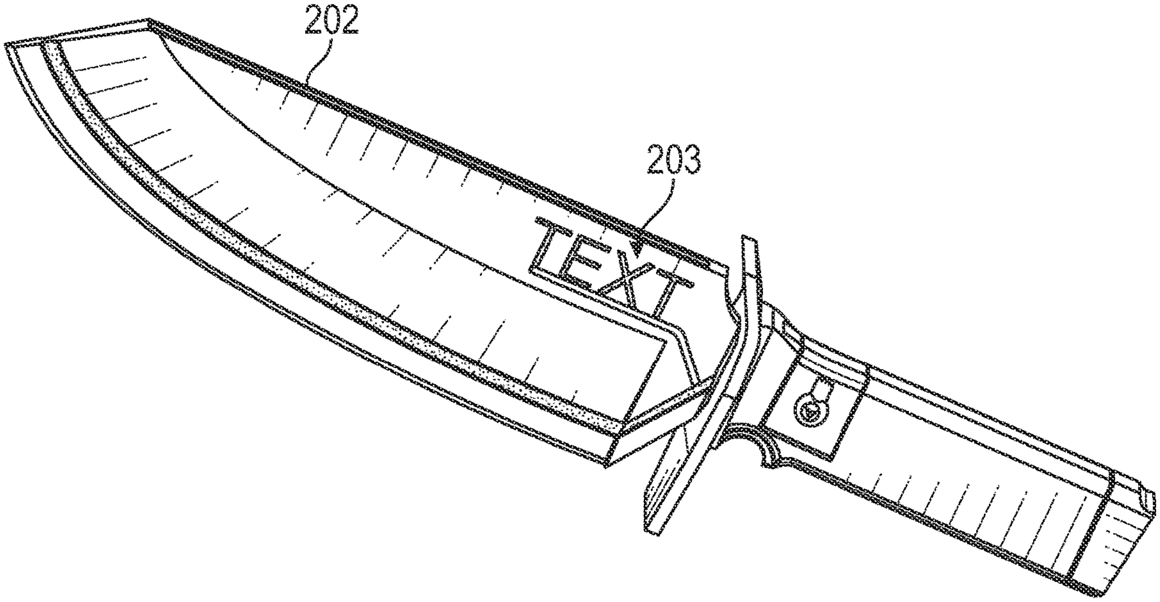
FIG. 2 shows an elevational view of the reverse side of the embodiment of FIG. 1.

One embodiment of a bladed weapon may be shaped like a knife, as shown in FIGS. 1-2. Blade 100 preferably comprises one or more channels 101 in each of which are disposed a conductive element and an insulating element separating the conductive element from the blade. The channels may trace the edge of blade 100 or be disposed along the face, serrations, or spine 202 of blade 100. The conductive channels may take the form of linear and non-linear shapes, patterns, for example filigree, cross-hatching, or text 203. When active, sparking or arcing 103 occurs between the conductive element and the blade, which are preferably oppositely charged. An electronics package is preferably disposed within or around handle 104, and preferably comprises a stun circuit, an energy storage device such as battery 106, a trigger 107 to activate the device, and other optional components, for example lighted battery charge indicator 108 and "active" indicator light 109 on hub 105. While FIG. 1 shows one specific configuration of the electronics package, hub, and battery, the electronics package may be segmented differently or bundled together as a single unit depending on a given embodiment's construction.

Figure 3:
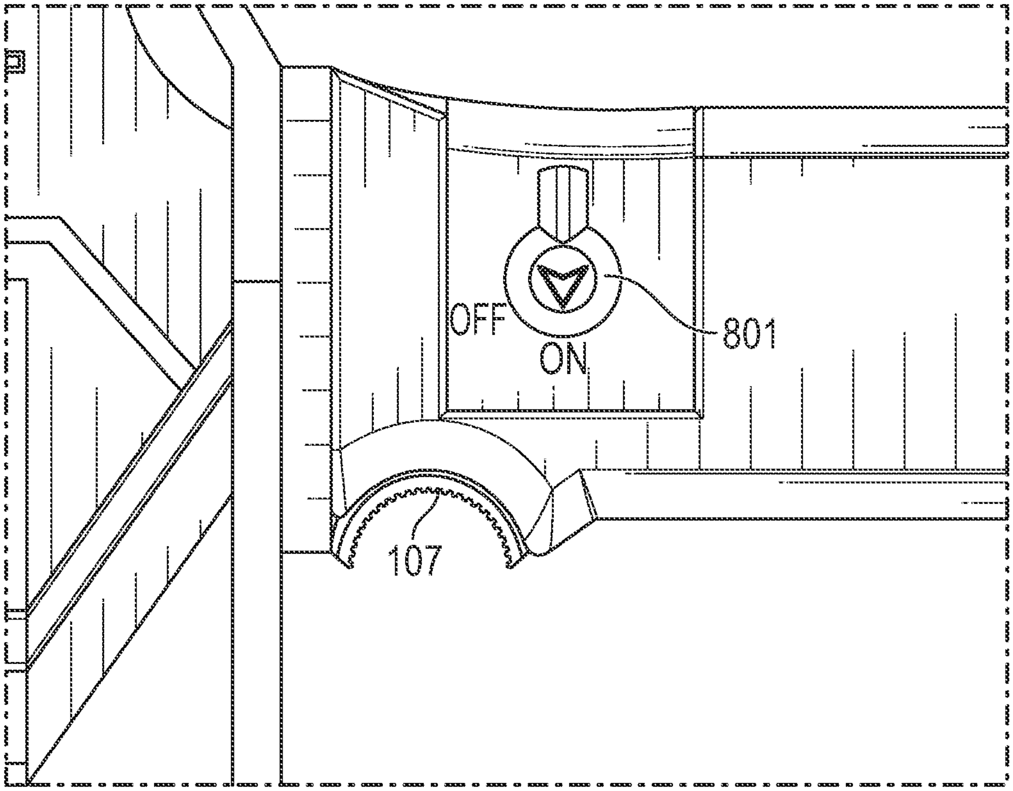
FIG. 3 shows an elevational view of an electronics package and multiple switch styles.

As shown in FIG. 3, the on/off switch can be implemented in one or more of at least three methods. A first method is using a manually operated switch, such as switch 801; when in the off position, the switch opens the electrical connection from the power source to the stun circuit; when the user turns the switch on, the electrical connection is closed. A second method is using a digitally-controlled switch, where a microcontroller or other digital device manipulates the stun circuit's output. Along with turning the stun circuit on and off, the user can preferably control voltage, oscillation changes, timing, or other properties with this switch. A third method is to activate a passive switch that detects a capacitance or resistance change on the blade or other conductive elements connected to the stun circuit, or otherwise detects an opponent touching one or more areas of one or more of the conductive element(s). In this method, if a resistance, capacitance, or other change is detected on an area of the blade or other conductive element, such as when the blade or element touches an opponent, the stun circuit will activate. This type of switch is useful if an attacker decides to grab the conductive area(s) directly or if the user has trouble controlling the device while being attacked. Examples of touch sensitive switches may be found in U.S. Pat. Nos. 2,782,308 and 2,896,131, incorporated herein by reference. Alternatively, the switch may be activated to close the circuit connecting the battery to the stun circuit in order to charge one or more capacitors in the stun circuit. The capacitors would preferably remain charged and preferably discharge when one or more of the conductive elements contact the opponent. Any or all of the aforesaid switching methods can be utilized simultaneously in the device. For example, the first method can be used as a "safety" switch, the second method to activate and control the stun circuit, and the third method as a redundancy. Another example may use the first method as an activation, the third method to detect contact, and the second method to modify voltage from a flashier "display" voltage to practical "stun" voltage when in contact with an opponent. Any such switch may be actuated by a button, relay, or any other type of switch on the device. The switch may be a switch which must be continually activated to remain closed, or may remain closed once it is moved into the desired position, as is well known in the art.

Figure 4:
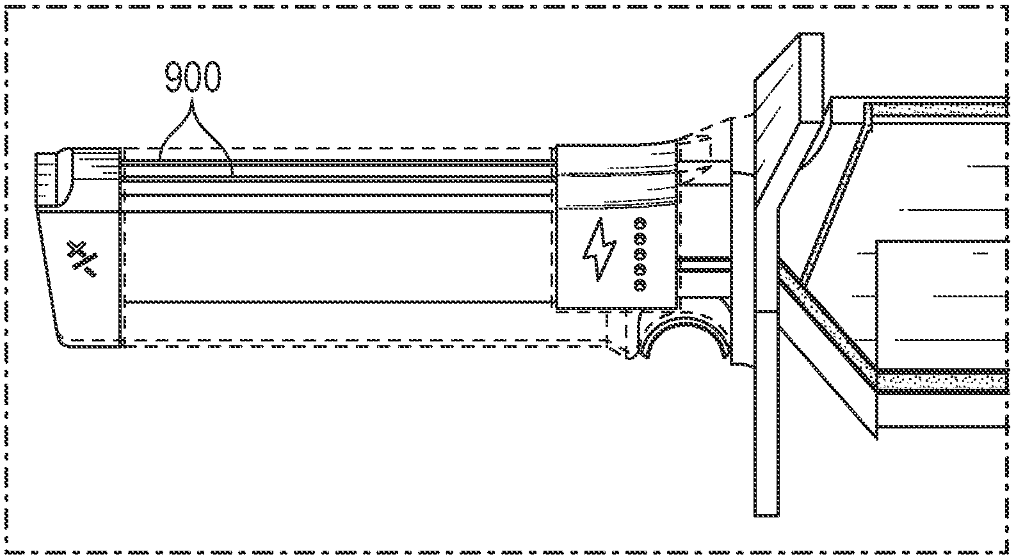
FIG. 4 shows a translucent close-up of a wiring from the electronics package.
Figure 5:
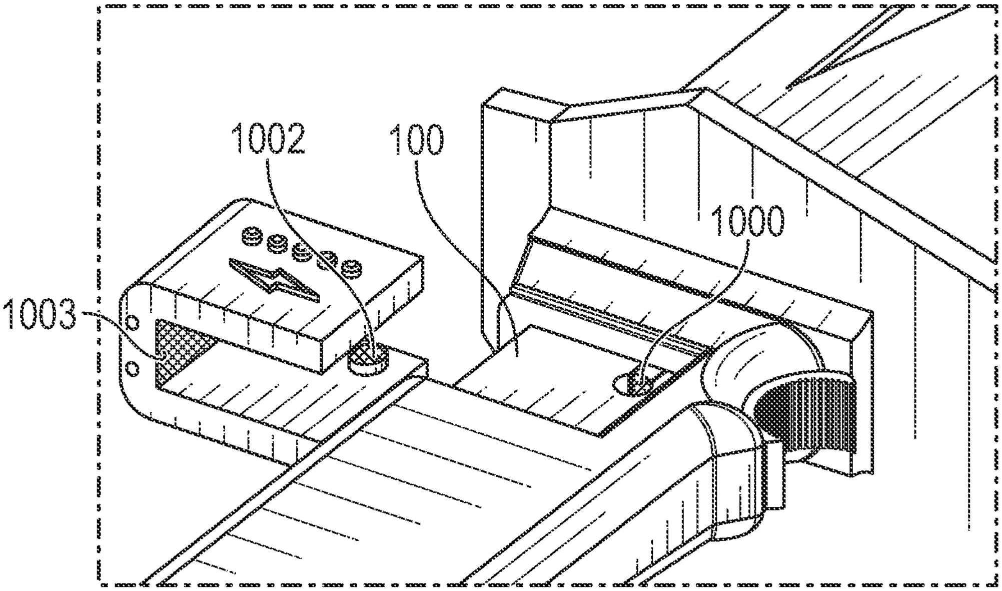
FIG. 5 shows a partially exploded view of the electronics package, blade, and handle.

When activated, the electronics package preferably uses electronic components to provide voltage and current suitable to stun, shock or intimidate an attacker. In one exemplary embodiment, as shown in FIGS. 4-5, the current is fed along wiring 900 to at least one first conductive output 1003, which mates with blade 100, and from at least one second conductive output 1002, which mates with one or more conductive elements 1000 which are disposed in channel(s) 101. This method of current delivery keeps the current that feeds the conductive channels separate from the current that feeds the blade. When the device is not in contact with an attacker, the current creates a visible and audible electric spark between the knife blade and the conductive element(s), preferably including bright flashes of light and loud noises, which may be intimidating to a potential attacker. If the blade and conductive elements are placed in contact with a person, the current may flow into and/or through the person, producing a shock or stun effect in the person. The stun effect is preferably non-lethal and may incapacitate, disorient, or otherwise affect the person touched.

Figure 6:
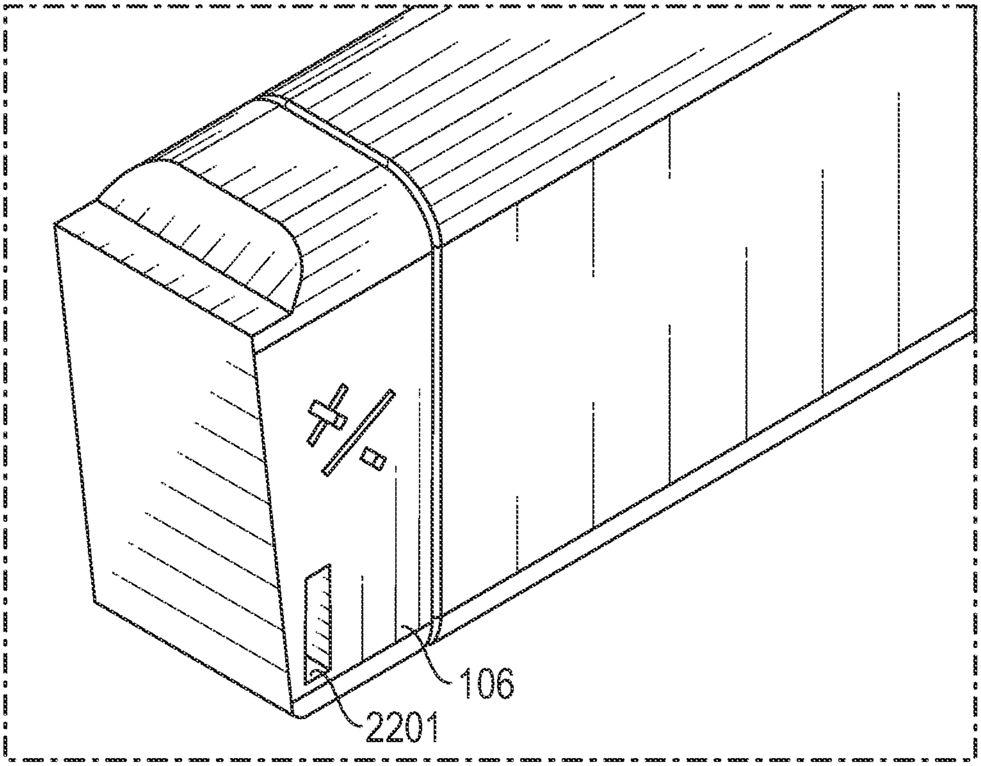
FIG. 6 shows an elevational view of an energy storage device and I/O charging port.

As the embodiments of the present invention are electrical, they will preferably include battery 106 or other energy storage device and optional charging port 2201 for charging the battery, as shown in FIG. 6. Multiple batteries can be configured in series or in parallel to power the device. The power source may be housed anywhere within the device, for example in a pommel, along or within the handle, or inside or along the blade guard. An external battery or power source may optionally be plugged into the device for emergency purposes. The inclusion of a battery or other power source may in some embodiments provide the device with added functionality. For example, by including the appropriate contacts or other interfaces, such a weapon may have functionality for soldering, fire-starting, recharging electronic devices, and so on. In other words, the battery of the device can be used to power or charge other electronic devices via a power terminal connected to the on-board battery. The power terminal can connect to other devices such as phones, flashlights, or electronic fire starters via the appropriate interface or wiring or other conductive material.

Figure 7:
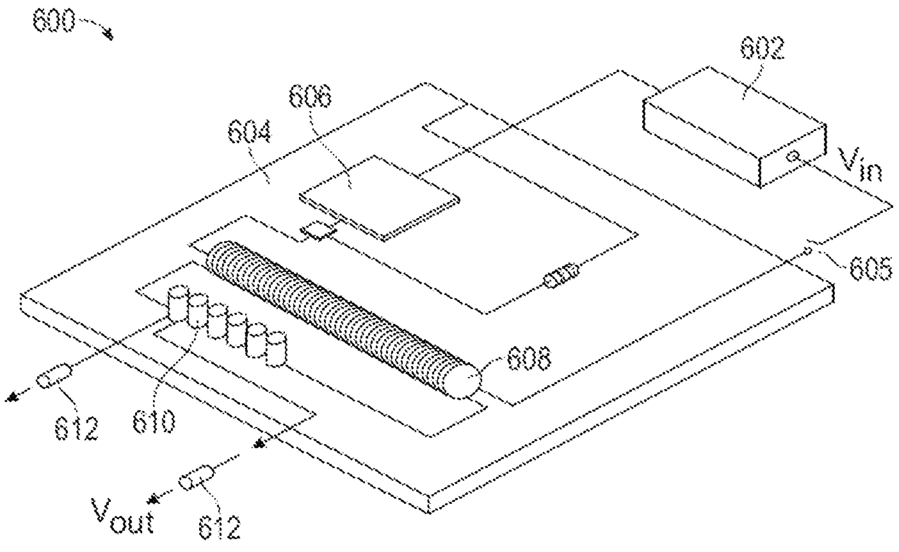
FIG. 7 shows a schematic of an example of a stun circuit and power source of the present invention.

One or more stun circuits may be included in the device; use of more than one stun circuit may provide a secondary stun option to a different area of the device. Such circuits for stun devices are well known in the art; see for example U.S. Pat. Nos. 3,362,711, 5,467,247, or 4,084,218, incorporated herein by reference. In the example shown in FIG. 7, electronics package 600 preferably comprises power source 602, for example a battery, stun circuit 604 to convert the power source output to charge the blade or blades (or other conductive elements) sufficiently to intimidate, shock, or stun an opponent, and switch 605 to activate or otherwise power the circuit. The electronics package and/or power source may be connected to a power terminal to recharge batteries, power the device externally, or power other devices using the on-board battery. Stun circuit 604 preferably features active and/or passive electronic components that transform the power source's voltage and current into a voltage and current used to intimidate or subdue a potential or actual attacker. When the battery's charge feeds into the stun circuit, a transformer, capacitor-diode voltage multiplier, and/or other electronics preferably increases and oscillates the voltage. Although any circuit configuration may be employed, in one embodiment stun circuit 604 comprises 555 timer 606 to produce AC, and step-up transformer 608 and capacitor-diode voltage multiplier 610 to create the output voltage required to produce the stun effect. Outputs 612 of stun circuit 604 are electrically connected, such as via wires, to the blade and other conductive elements of the device. In some embodiments the positive charge from the stun circuit outputs to one blade or conductive area, jumps a non-conductive gap or material (or alternatively flows through the opponent's body), and finally completes the circuit with a negatively charged blade or conductive area. The stun circuit's output voltage is preferably powerful enough to produce arcing and crackling between the oppositely charged conductive elements, intimidating a potential attacker. In some embodiments the stun circuit's output is powerful enough to immobilize or otherwise shock the attacker and/or inflict pain. The stun circuit is preferably small enough to be stored somewhere along or inside of the device, such as in a pommel or along the blade guard. In some embodiments the stun circuit provides AC current to the conductive elements such that they alternate between being positively and negatively charged, but are preferably always oppositely charged. Wherever AC is referred to herein, DC may alternatively be used as long as the conductive element(s) and blade are charged to different voltages, for example opposite polarities. Any form of current and charging may be used as long as it creates the arcing, shock, and/or stun effects of the present invention. Similarly, wherever opposite charge is referred to herein, different voltage levels of the same polarity may alternatively be used.

Figure 8:
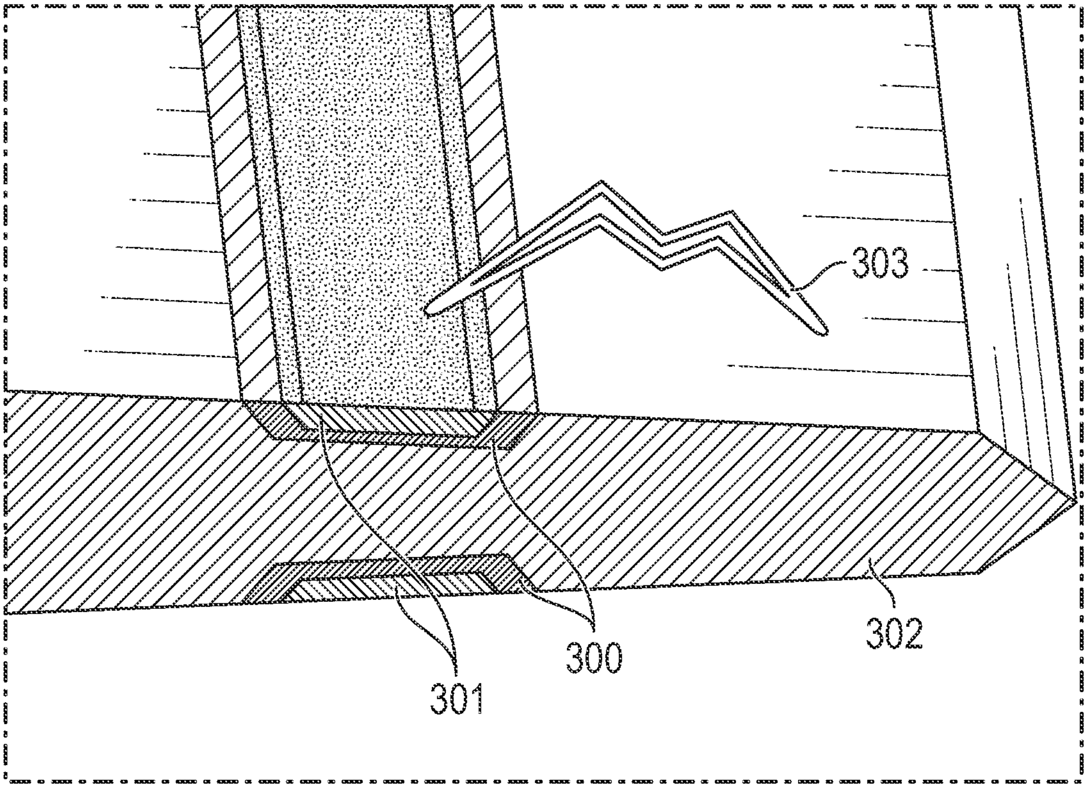
FIG. 8 shows a cross-sectional view of a blade comprising channels comprising insulating and conductive materials that are flush with the surface of the blade.
Figure 9A:
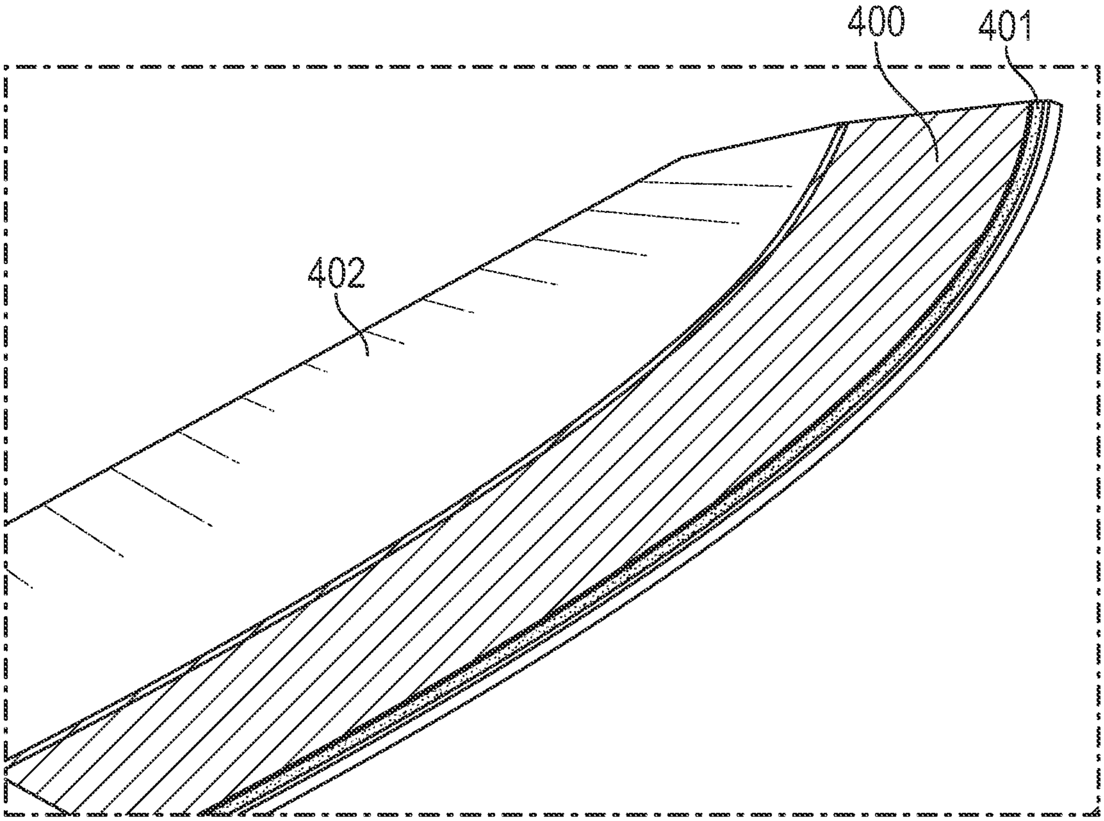
FIG. 9A shows an elevational view of a blade comprising insulating and conductive elements disposed above the surface of the blade.
Figure 9B:
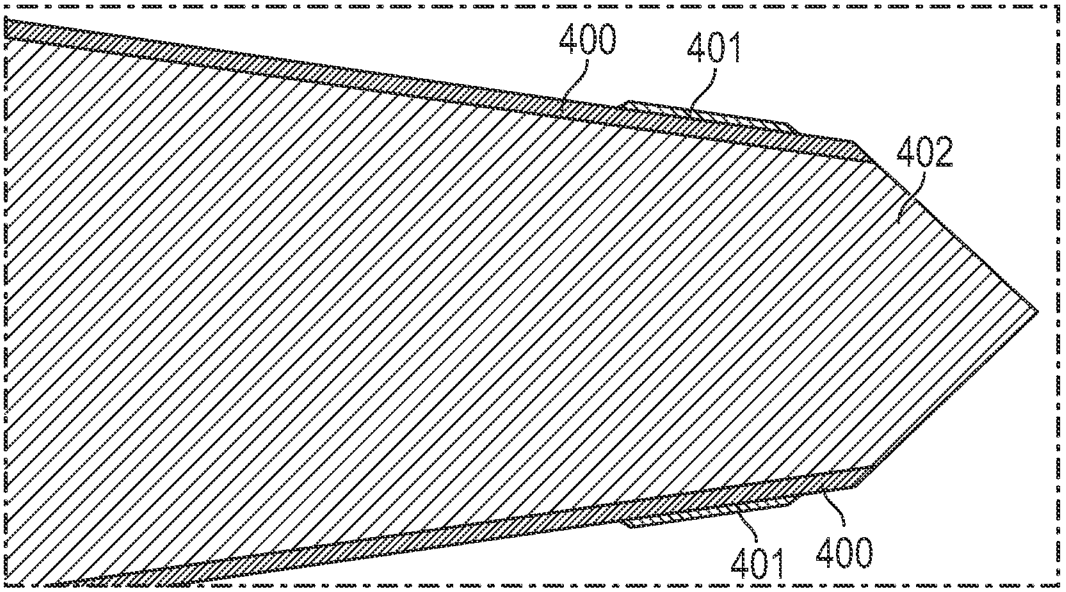
FIG. 9B shows a cross-sectional view of the blade of FIG. 9A.
Figure 10:
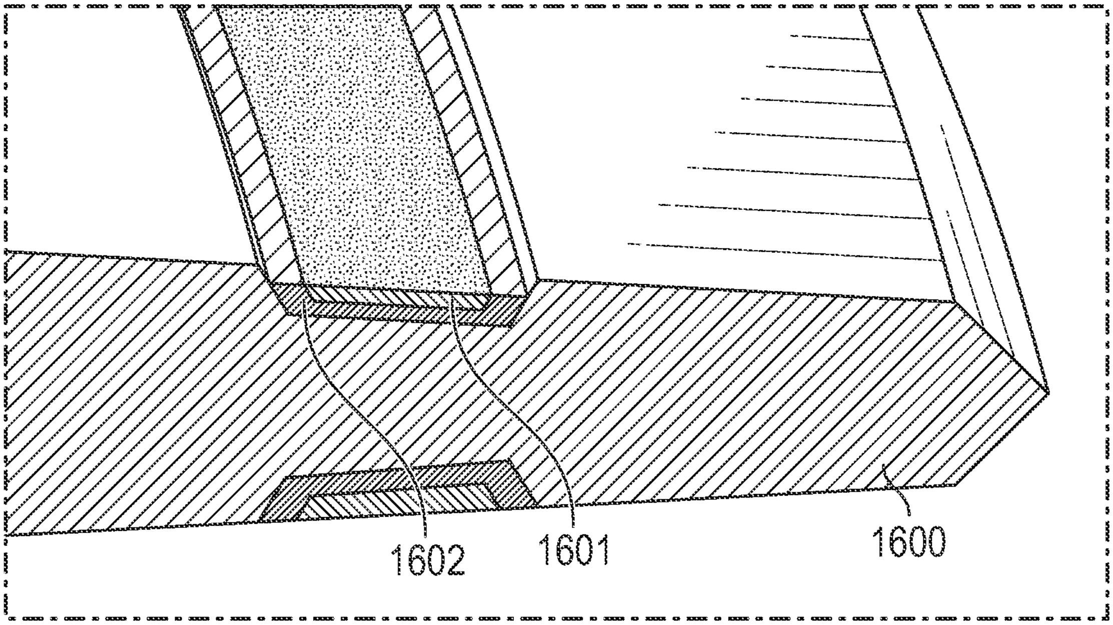
FIG. 10 shows a cross sectional view of a blade comprising insulating and conductive elements disposed below the surface of the blade.
Figure 11:
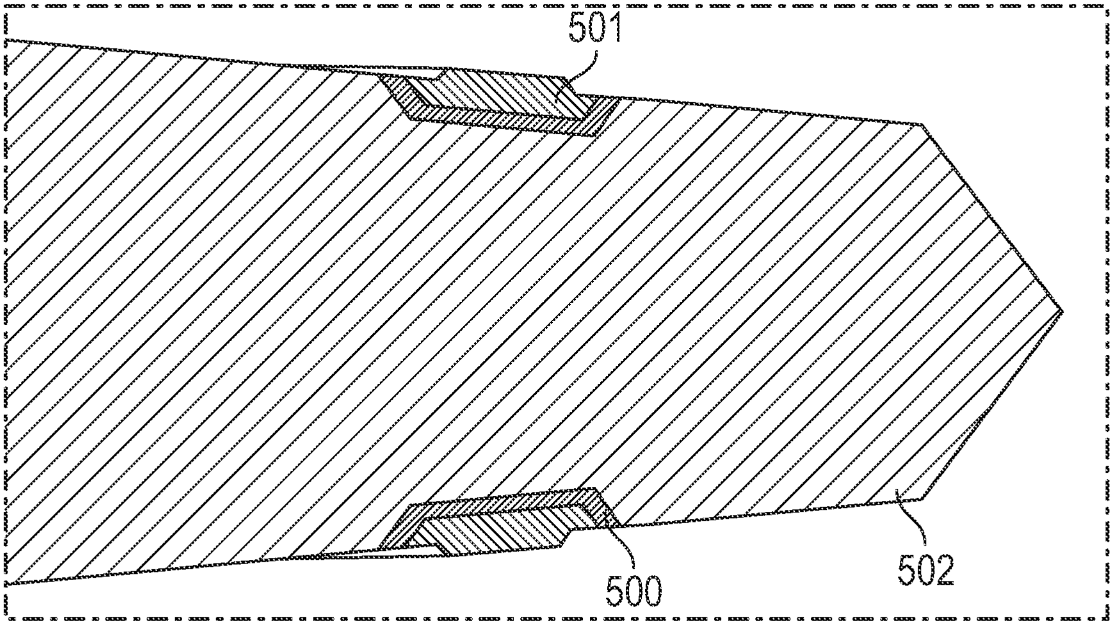
FIG. 11 shows a cross-sectional view of a blade and a channel comprising insulating and conductive elements flush and disposed higher than the surface of the blade, respectively.
Figure 12:
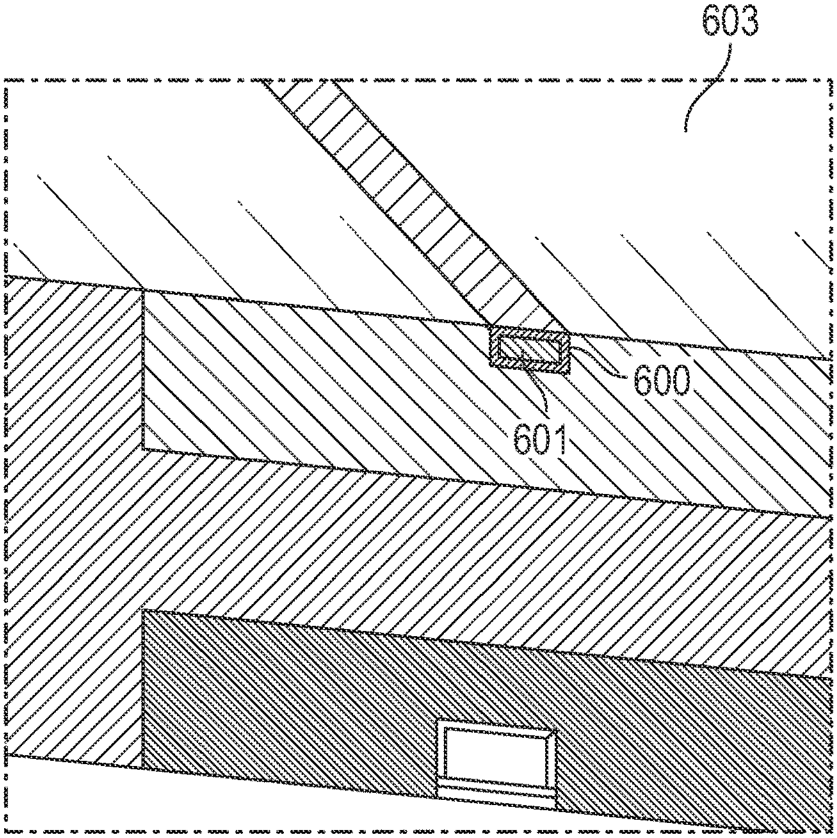
FIG. 12 shows a cross-sectional view of a blade and channels comprising an insulating element completely surrounding the conductive element.
Figure 13:
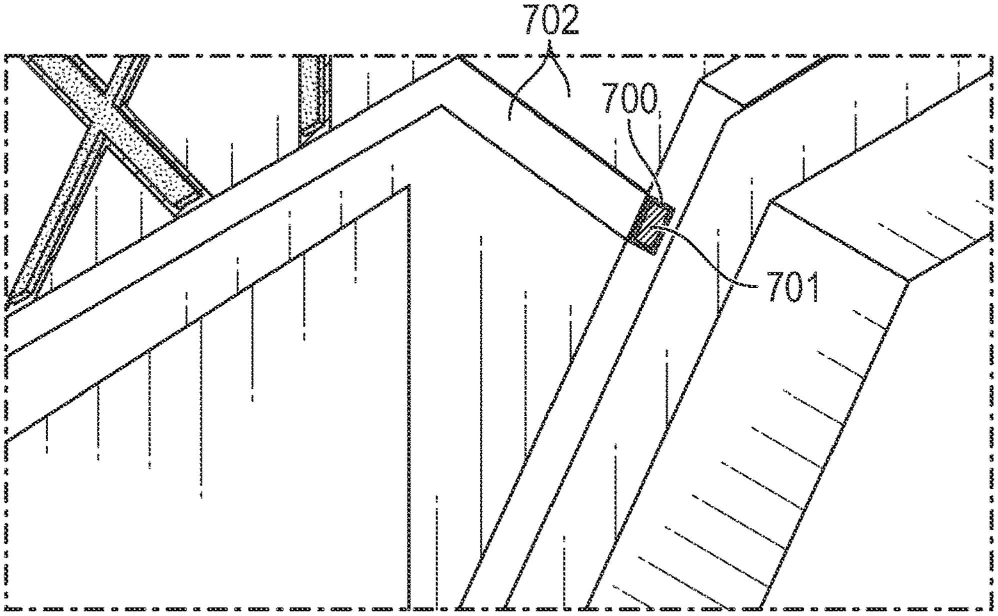
FIG. 13 shows a sectional view of a blade and a channel comprising insulating and conductive elements covered by a layer of the blade material.

The insulating and conductive elements can have any design, cross-sectional shape, size, and relationship to the surface of the blade. As shown in FIG. 8, the size and shape of insulating elements 300 and conductive elements 301 disposed in the channel(s) in blade 302 may be chosen so that insulating elements 300 and conductive elements 301 are approximately flush with the surface of blade 302. Sparks or arcing 303 between a conductive element 301 and blade 302 is shown schematically. Alternatively, as shown in FIGS. 9A-9B, insulating element 400 and conductive element 401 may be configured to be above the surface of blade 402. As shown in this embodiment, the insulating element(s) may be shaped differently than the conductive element(s). Or, as shown in FIG. 10, insulating element 1602 and conductive element 1601 may be configured so that the surfaces of insulating element 1602 and conductive element 1601 are set below the surface of blade 1600. In the alternative shown in FIG. 11, insulating element 500 and conductive element 501 are configured so that the surfaces of insulating element 500 and conductive element 501 are set differentially, i.e. below, flush, and/or above the blade 502. As shown in the embodiment of FIG. 12, insulating element 600 can completely surround conductive element 601 along one or more portions of blade 603. And, as shown in the embodiment of FIG. 13, insulating element 700 and/or conductive element 701 may be hidden underneath a layer of blade material 702 or another material. Any device of the present invention may comprise any of these configurations, other configurations, or combinations thereof.

Figure 14:
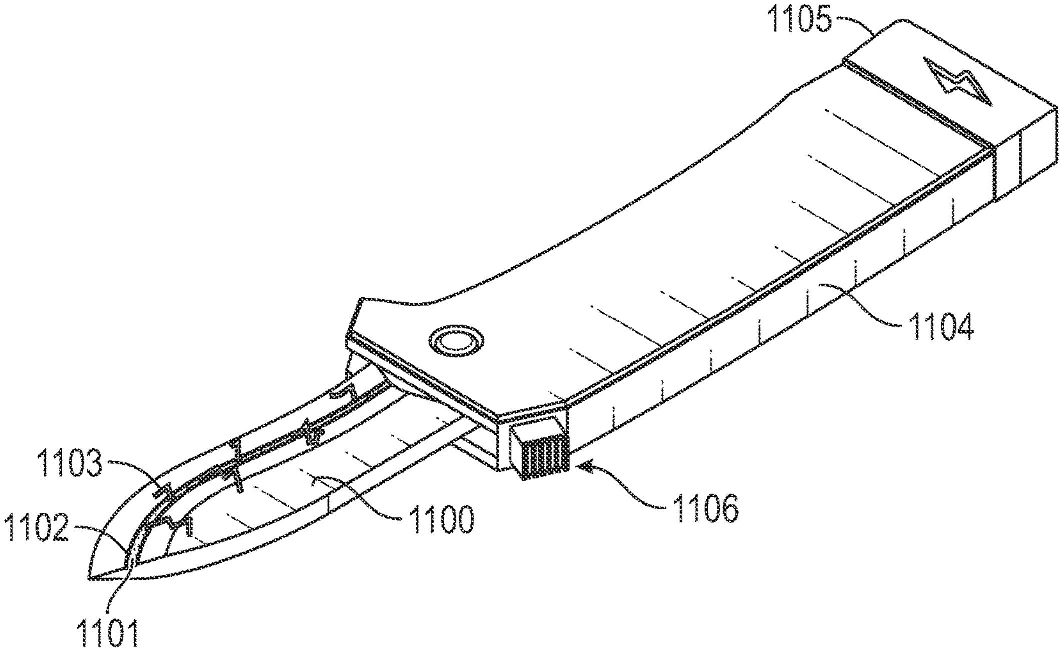
FIG. 14 shows an elevational view of a folding pocket knife in the "open" position.
Figure 15:
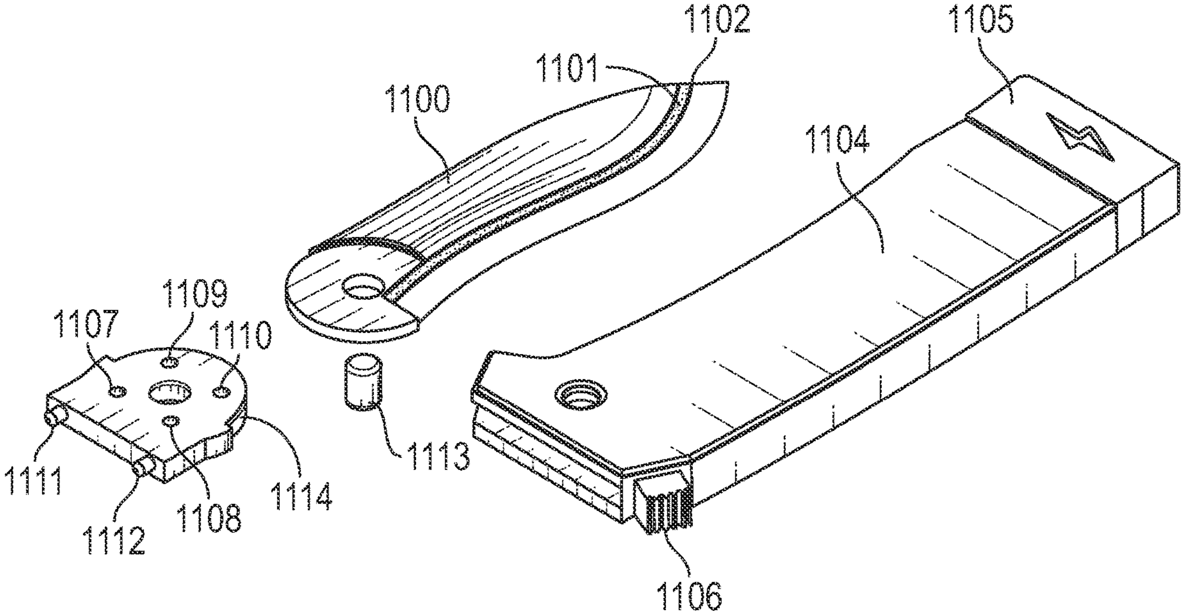
FIG. 15 shows a partially exploded view of the folding pocket knife of FIG. 14.
Figure 16:
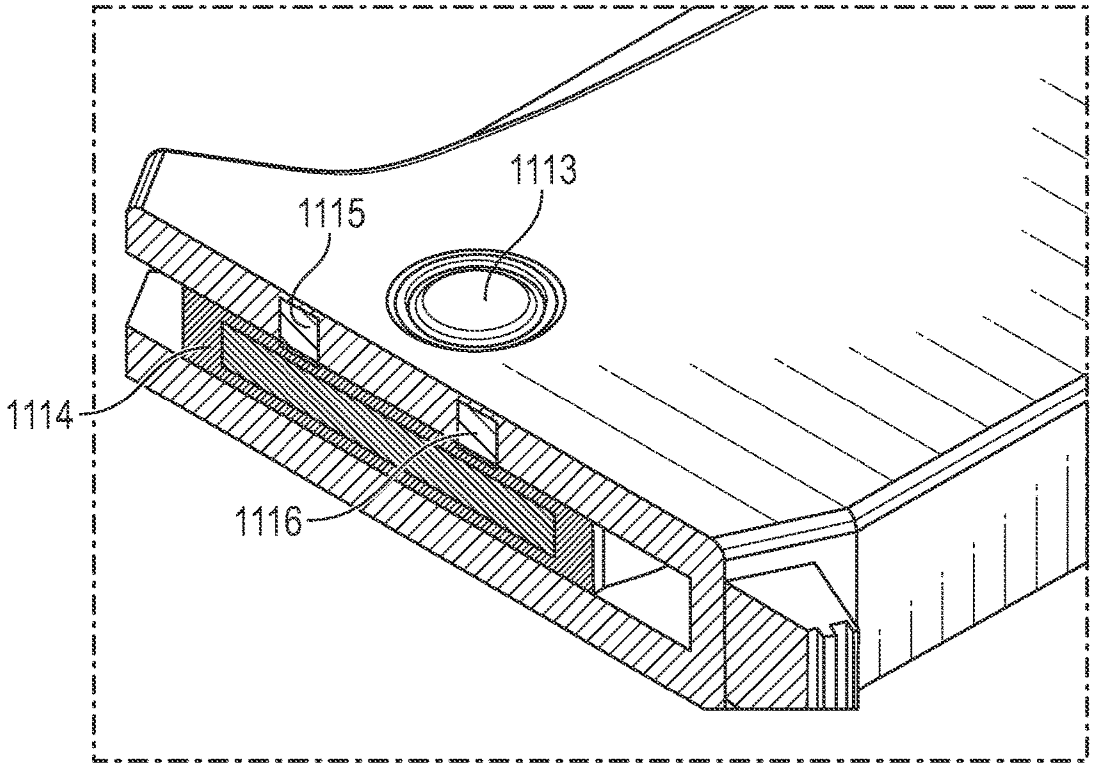
FIG. 16 shows a sectional view of the folding pocket knife of FIG. 14.
Figure 17:
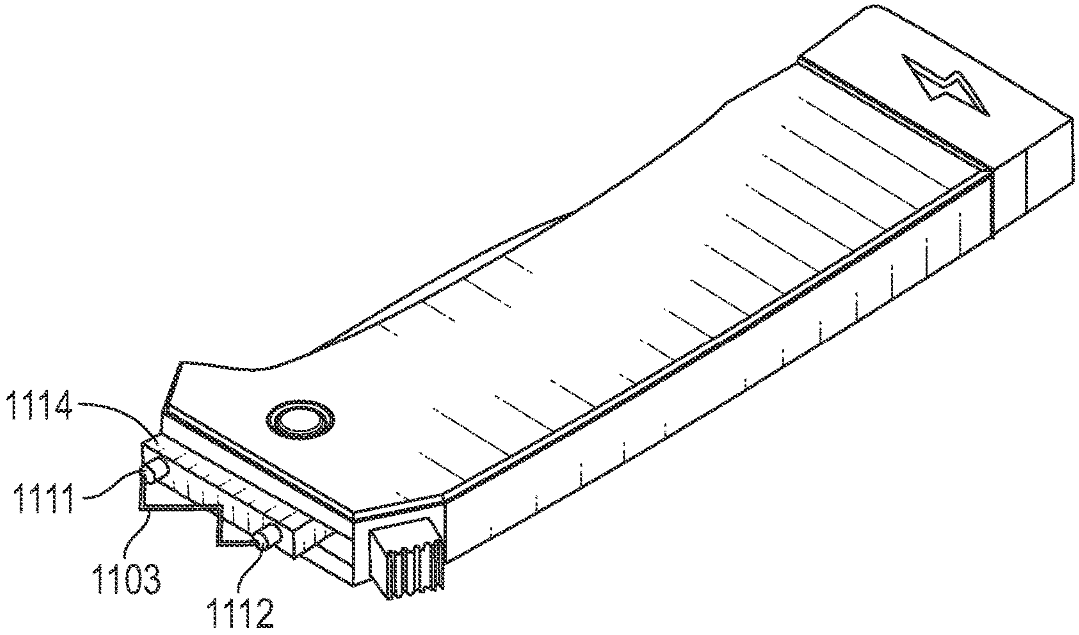
FIG. 17 shows an elevational view of the folding pocket knife of FIG. 14 in the "closed" position.
Figure 18:
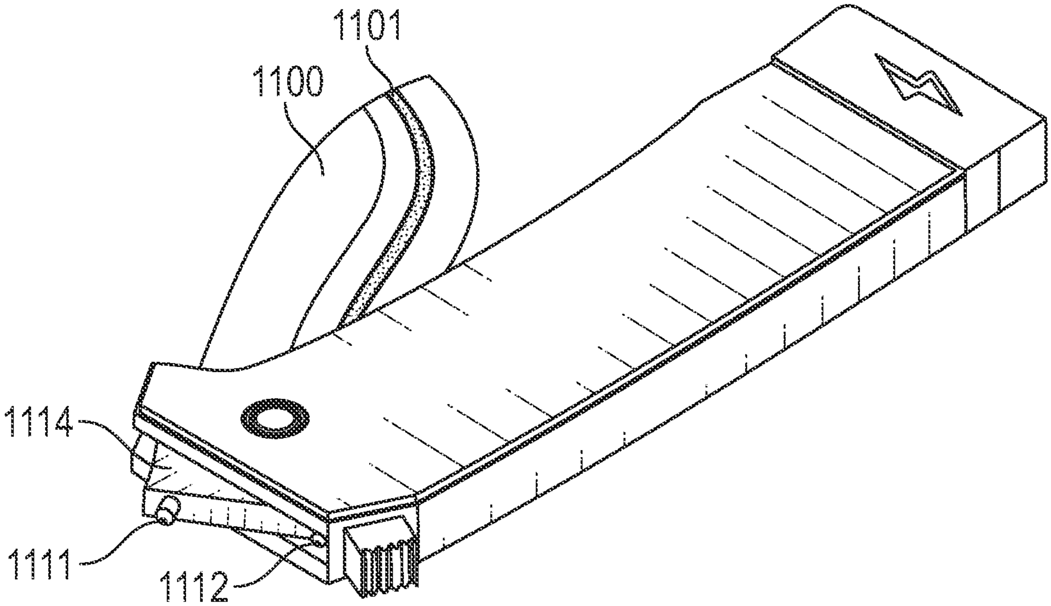
FIG. 18 shows an elevational view of the folding pocket knife of FIG. 14 in the "partially open" position.

An embodiment of the present invention is a folding pocket knife, as shown in FIGS. 14-18. The partially exploded view of this embodiment shown in FIG. 15 and the detailed sectional view of FIG. 16 show where washer contact points 1107, 1108 (when the knife is closed) and 1109, 1110 (when the knife is open) on insulating washer 1114 meet corresponding contact points 1115 and 1116, which are preferably embedded into preferably insulating handle 1104 and electrically connected to the electronics package 1105. Washer 1114 and blade 1100 spin to "open" and "closed" positions via axis pin 1113. When blade 1100 is in the "open" position, as shown in FIG. 14, it is preferably rotated until it at full extension and is optionally locked in place, in which position washer contact point 1109 is in electrical contact both with blade 1100 and with corresponding contact point 1116, and washer contact point 1110 is in electrical contact both with conductive element 1101 and with corresponding contact point 1115. When the user activates electronics package 1105 via switch 1106, electricity flows through the contact points, the blade, and the conductive element, creating an arcing or sparking 1103 from blade 1100 to conductive element 1101 across insulating element 1102. When blade 1100 is in the "closed" position, as shown in FIG. 17, the blade is rotated so that is disposed within insulating handle 1104, in which position washer contact point 1107 is in electrical contact both with prong 1111 and with corresponding contact point 1115, and washer contact point 1108 is in electrical contact both with prong 1112 and with corresponding contact point 1116. In this configuration, when the user activates electronics package 1105 via switch 1106, electricity 1103 sparks between the two prongs 1111, 1112. When the embodiment's blade is in the partially open position, as shown in FIG. 18, none of washer contact points 1107, 1108, 1109, 1110 are in contact with the corresponding contact points 1115, 1116. This prevents the user from accidentally enabling the flow of electricity to blade 1100, conductive element 1101, or prongs 1111, 1112.

Figure 19:
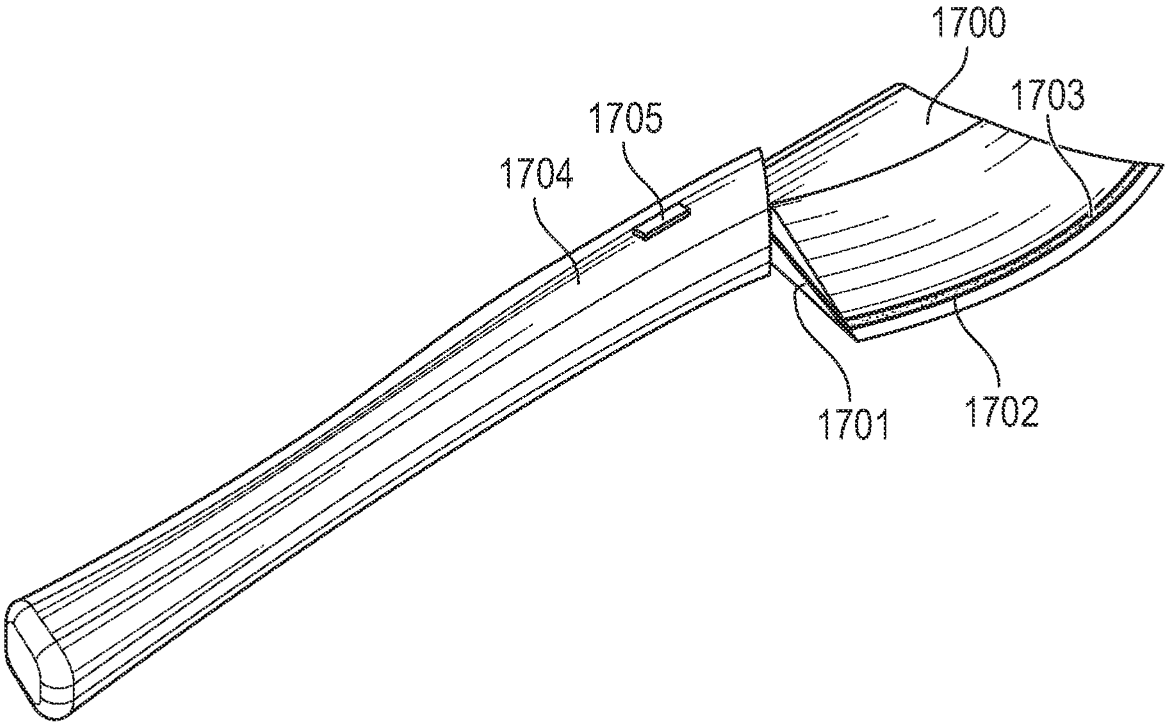
FIG. 19 shows an elevational view of an axe or hatchet.

Another embodiment of the present invention is shaped as an axe or hatchet, as shown in FIG. 19. Head 1700 of the axe or hatchet comprises insulating element 1702 layered underneath conductive element 1703, which is connected via insulated conductor 1701 to an electronics package integrated into handle 1704 and activated by switch 1705.

Figure 20:
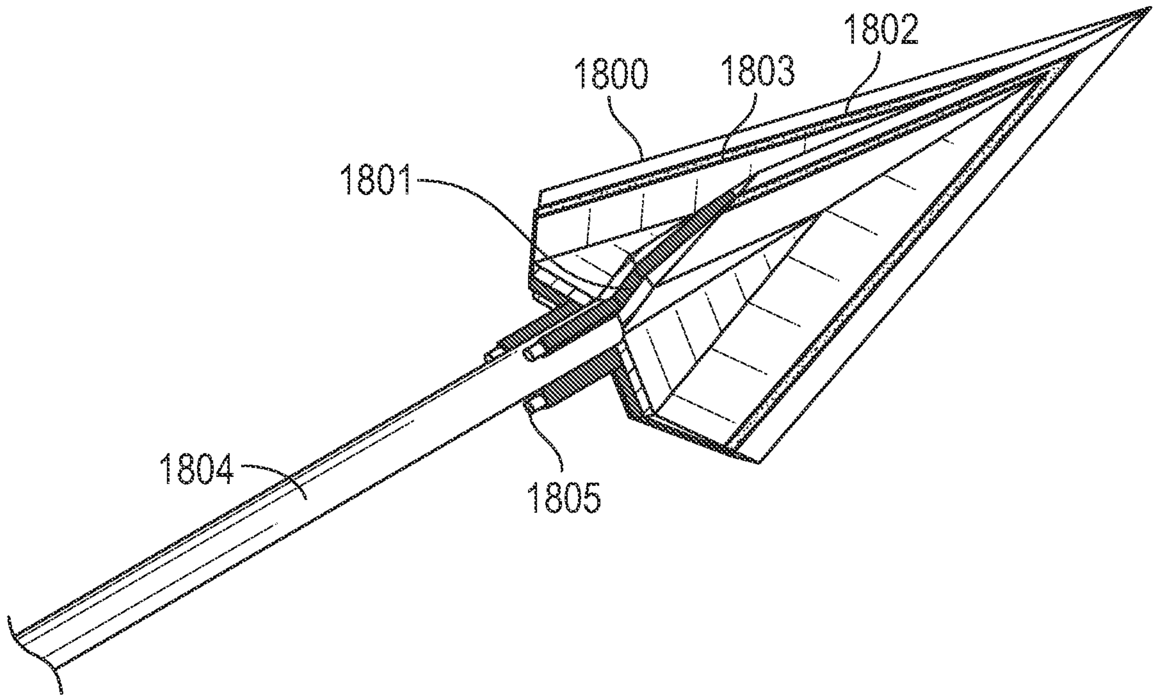
FIG. 20 shows an elevational view of an arrow or spear head with an activation switch.

Yet another embodiment of the present invention is shaped as a spear or arrow. As shown in FIG. 20, head 1800 of the spear or arrow comprises insulating element 1802 layered underneath conductive element 1803, which is connected via covered or insulated conductor 1801 to an electronics package preferably integrated into shaft or handle 1804 and activated by a switch 1805, which is preferably located underneath the blade segments. It should be noted that while FIG. 20 features one blade with 3 non-coplanar blade segments centered uniformly around the pole of the arrow or spear, any number of segments or any version of blade styles may be used.

Figure 21:
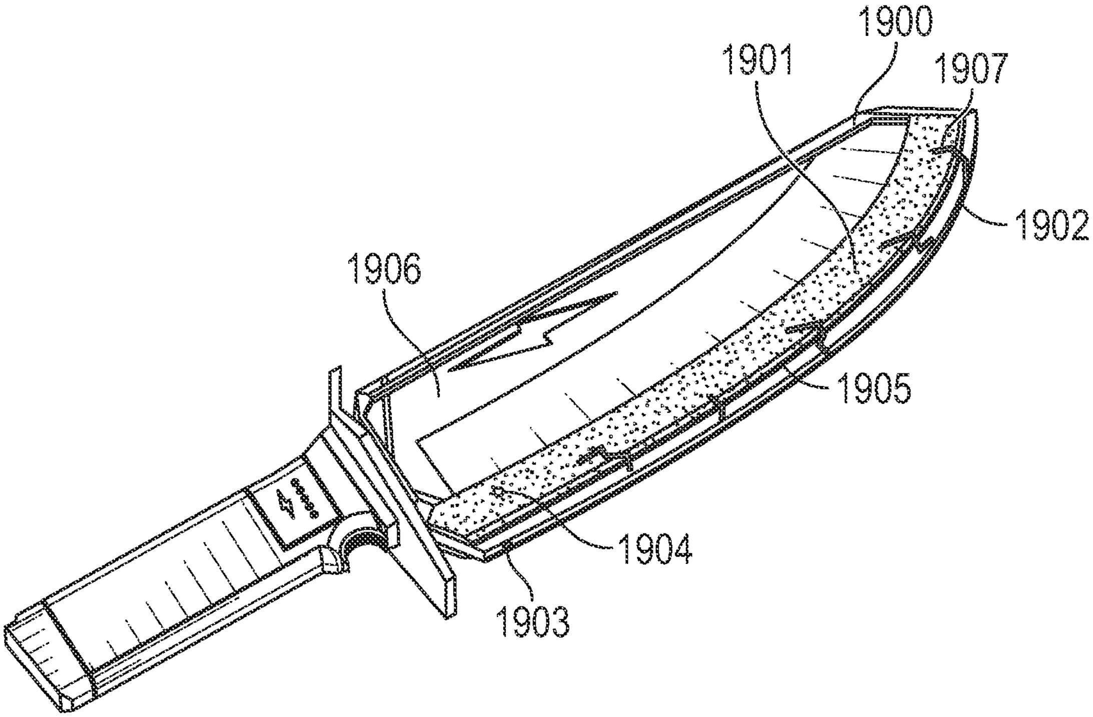
FIG. 21 shows an elevational view of a specialized sheath covering a bladed weapon.
Figure 22:
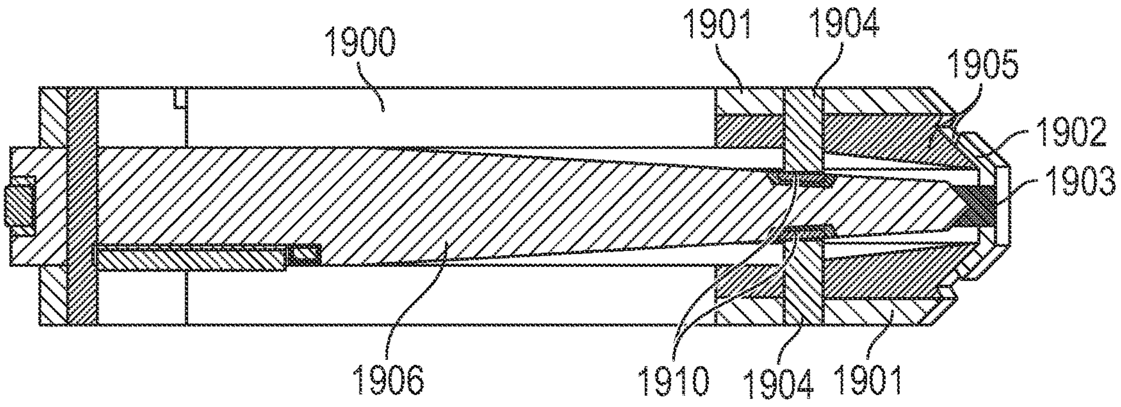
FIG. 22 shows a sectional view of the specialized sheath of FIG. 21.
Figure 23:
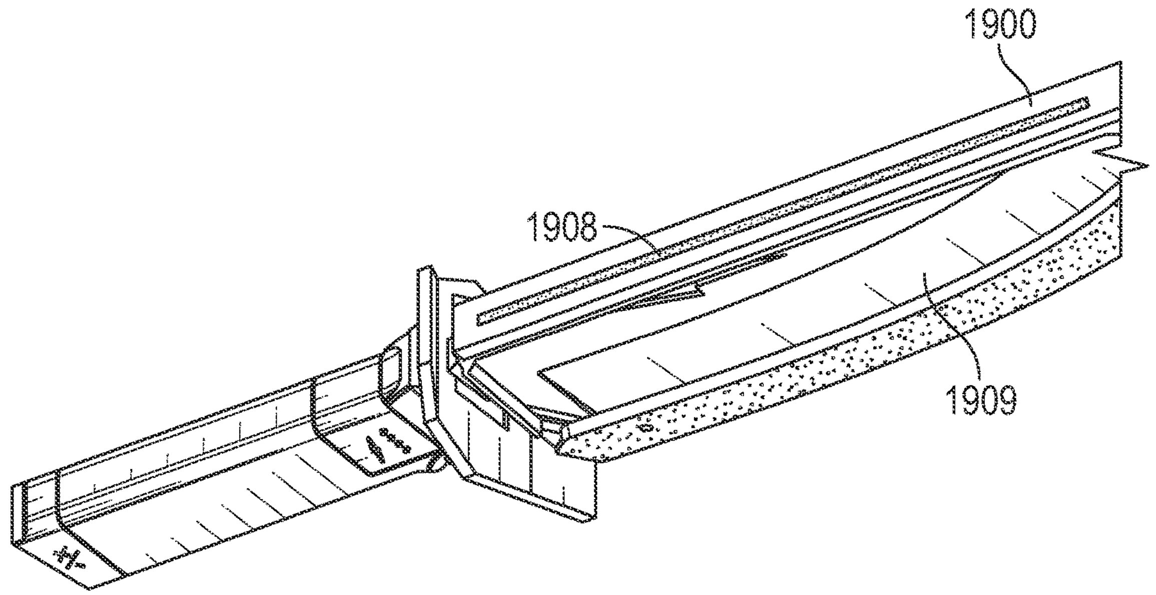
FIG. 23 shows an elevational view of the specialized sheath of FIG. 21.

FIGS. 21-23 show a sheath at least partially covering knife blade 1906. While most sheaths are typically meant only to enclose and store a bladed weapon, this sheath allows the user to wield the device while dramatically lowering the lethality by covering the edge of the knife blade. The sheath preferably comprises electrically insulating sheath portions 1900, 1905 and conductive sheath portions 1901, 1902. Unsharpened, conductive sheath portions 1901 and 1902 draw power from the weapon via conductive posts 1904 that are in electrical contact with conductive elements 1910 and via conductive post 1903 that is contact with blade 1906, respectively, when the sheath is in place. The cross-sectional view of the device shown in FIG. 22 further explains the connections between the blade and conductive elements on the sheath. Conductive posts 1904 are in contact both with conductive elements 1901 on the sheath and with conductive channels 1910. Conductive post 1903 is in contact both with conductive element 1902 on the sheath and with blade 1906. Insulating sheath portions 1905 provide an electrical barrier between conductive sheath portions 1901 and 1903. The sheath may expose portions of the blade such as blade face 1909 and blade spine 1908, as shown in FIG. 23. Other portions of the blade may be exposed where necessary or desirable.

When the user activates the electronics package, conductive posts 1904 draw current from conductive channels 1910 to conductive sheath portions 1901, and conductive post 1903 draws current from conductive blade 1906 to conductive sheath portion 1902. Such current creates sparks 1907 between conductive sheath portions 1901 and conductive sheath portion 1902. The sheathed weapon may be used to deliver non-lethal and/or stunning blows in combat or to provide non-combat functionality, as described above. If a conflict escalates or the non-lethal modality is not sufficient to end the conflict, the sheath may be removed quickly and easily to provide the weapon with cutting and other life-threatening abilities. A sheath of suitable design may be configured to be used with any embodiment of the present disclosure, regardless of whether or not the sheathed embodiment is disclosed herein, without departing from the spirit and scope of the present disclosure. The sheath may comprise leather, composite plastic, or another appropriate material. An attachment to user's belt such as via a belt loop provides device storage, traditional for most small bladed weapons.

Figure 24:
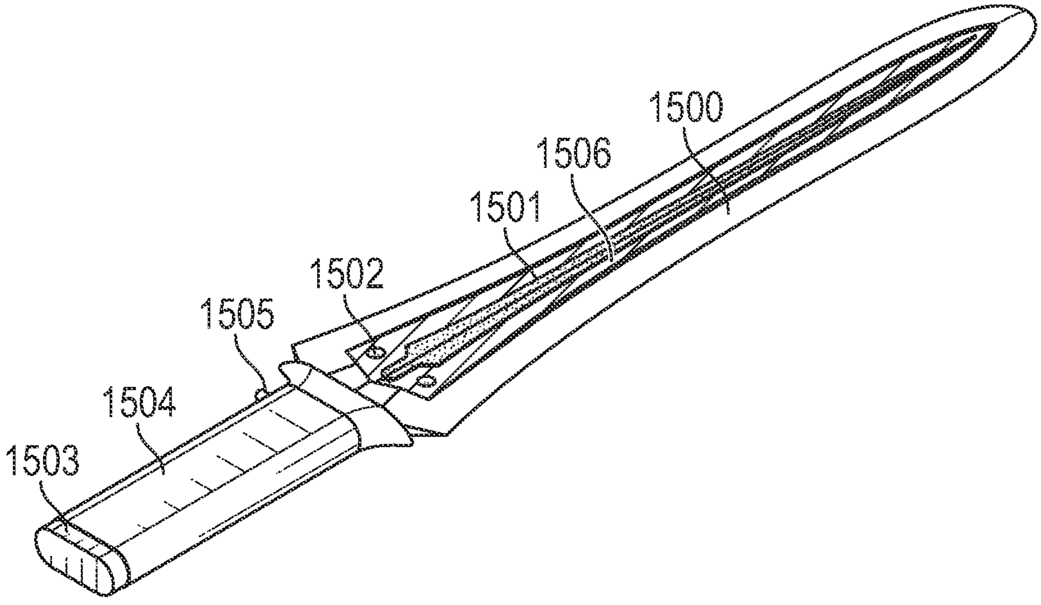
FIG. 24 shows an elevational view of a "double-edge" sword of the present invention.
Figure 25:
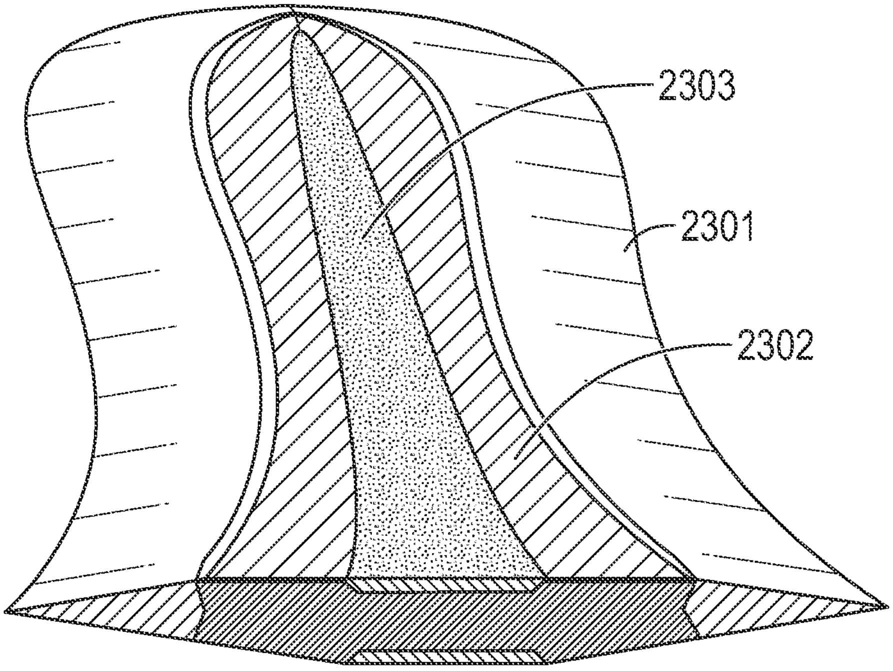
FIG. 25 shows a perspective view of the sword of FIG. 24 mounted directly onto an insulating core.

Another embodiment of a bladed weapon may be shaped like a sword, a "double-edged" version of which is shown in FIG. 24. Double-edged blade 1500 comprises insulating element 1506 which separates several uniquely shaped conductive channels 1501, 1502 from blade 1500. This embodiment features an electronics package mounted primarily as pommel 1503 on handle 1504 and activated by switch 1505. As shown in this embodiment , the insulating element(s) may be shaped differently than the conductive element(s). FIG. 25 shows a perspective view of a version of FIG. 24. In this construction, the blade 2301 is mounted to and around insulating core 2302 and conductive element 2303 is embedded into insulating core 2302.

Figure 26:
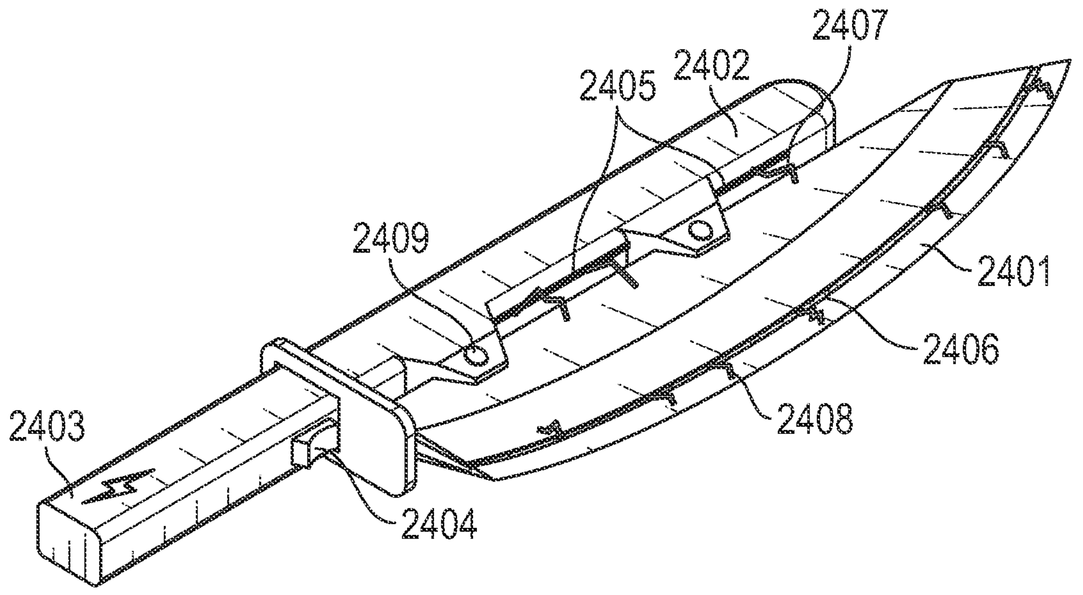
FIG. 26 shows an elevational view of a blade mounted onto the electronics package and partially separated by air in a "halberd" configuration.
Figure 27:
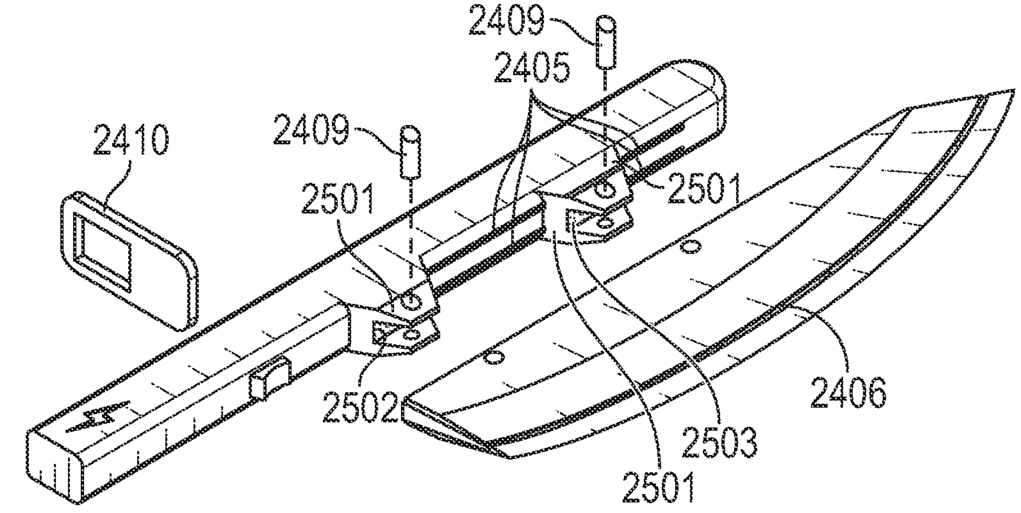
FIG. 27 shows a partially exploded view of the device of FIG. 26.
Figure 28:
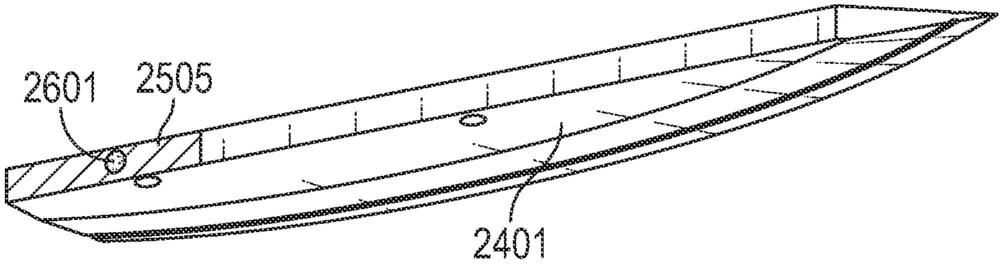
FIG. 28 shows the blade of FIG. 26.

FIGS. 26-28 show another embodiment of the present invention in which a blade is mounted at least partially to a handle comprising an insulating material with an integrated electronics package. Blade 2401 is preferably mounted to offset portion 2501 of insulated handle 2402 via pins 2409, such that the insulated handle and the blade are preferably at least partially separated by an air gap. Blade 2401 is preferably prevented from contacting the user's hand by guard 2410. When integrated electronics package 2403 is activated by switch 2404, conductive channels 2405 on insulated handle 2402 and conductive channels 2406 on blade 2401 are preferably charged oppositely to the charge on the blade itself, or to a different voltage. This enables electricity 2407 to spark between blade 2401 and insulated handle 2402 across the air gap, and for electricity 2408 to spark between blade 2401 and conductive channels 2406. Handle connection point 2502 is preferably in contact with electrical contact 2601, which is disposed on electrically insulated portion 2505 of the spine of blade 2401 and is in electrical contact with and charges conductive channels 2406. Handle connection point 2503 preferably oppositely charges blade 2406.

Note that in the specification and claims, "about" or "approximately" means within twenty percent (20%) of the numerical amount cited. As used herein, the singular forms "a," "an," and "the" include plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A device comprising:

an electrically conductive sharpened blade;

one or more electrically conductive elements;

one or more electrically insulating elements separating the one or more electrically conductive elements from the blade;

a power supply;

a circuit configured to enable the blade and/or the one or more electrically conductive elements to produce an electrical effect;

a switch for electrically connecting the circuit to the blade and/or the one or more electrically insulating elements; and a member electrically insulated from the blade and the one or more electrically conductive elements, the member configured for a user to grip the device.

2. The device of claim 1 wherein the electrical effect is selected from the group consisting of sparking, arcing, shocking an opponent of a user of the device, stunning an opponent of a user of the device, or combinations thereof.

3. The device of claim 2 wherein the sparking or arcing occurs between the blade and the one or more electrically conductive elements across the one or more electrically insulating elements.

4. The device of claim 2 wherein the sparking or arcing occurs between two of the one or more electrically conductive elements.

5. The device of claim 2 wherein shocking an opponent of a user of the device or stunning an opponent of a user of the device occurs when the opponent is near the device or is in contact with the device.

6. The device of claim 1 wherein at least one of the one or more electrically insulating elements is disposed on a surface of the blade.

7. The device of claim 1 wherein at least one of the one or more electrically insulating elements is disposed within a channel in a surface of the blade.

8. The device of claim 1 configured to resemble a weapon selected from the group consisting of knife, dagger, sword, axe, arrow, spear, hatchet, and machete.

9. The device of claim 1 configured as a folding knife, wherein at least one of the electrically conductive elements comprises a prong extending from the device when the blade is in a closed position.

10. The device of claim 9 wherein the prong is disposed within the member when the blade is in the closed position.

11. The device of claim 9 wherein the member comprises one or more electrical contacts.

12. The device of claim 11 wherein, when the blade is in the closed position, one of the electrical contacts electrically connects the prong to the circuit.

13. The device of claim 11 comprising two prongs;

wherein the member comprises two electrical contacts; and wherein, when the blade is in the closed position, each of the two electrical contacts electrically connects one of the two prongs to the circuit.

14. The device of claim 11 comprising two prongs, wherein the member comprises two electrical contacts, and wherein, when the blade is in an open position, one of the electrical contacts electrically connects the blade to the circuit, and the other electrical contact electrically connects the circuit to a blade electrically conductive element, wherein the blade electrically conductive element is disposed on an electrically insulating element disposed on a surface of the blade or in a channel in the surface of the blade.

15. The device of claim 11 wherein when the blade is between an open position and the closed position, the two electrical contacts are not electrically connected to the two prongs or the blade.

16. The device of claim 11 comprising an insulating mount to which the blade and the prong are mounted, the insulating mount comprising a plurality of mount contacts for connecting to the one or more electrical contacts.

17. A sheath configured for use with the device of claim 1, wherein when the sheath is installed it at least partially covers the blade.

18. The sheath of claim 17 comprising one or more electrically conductive portions, wherein when the sheath is installed the one or more electrically conductive portions are electrically connected to the blade and/or one or more of the electrically conductive elements.

19. The sheath of claim 18 wherein, when the device is operated, the one or more electrically conductive portions produce an electrical effect.

20. The sheath of claim 19 wherein the electrical effect is selected from the group consisting of sparking, arcing, shocking an opponent of a user of the device, stunning an opponent of a user of the device, or combinations thereof.

* * * * *